United States Patent
Mahajan et al.

(10) Patent No.: US 7,954,008 B2
(45) Date of Patent: May 31, 2011

(54) OBJECTIVE ASSESSMENT OF APPLICATION CRASHES FROM A CUSTOMER ENVIRONMENT

(75) Inventors: Dhananjay Madhusudan Mahajan, Sammamish, WA (US); John Leo Ellis, Sammamish, WA (US); Ram P. Papatla, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 295 days.

(21) Appl. No.: 11/623,267

(22) Filed: Jan. 15, 2007

(65) Prior Publication Data

US 2008/0172583 A1    Jul. 17, 2008

(51) Int. Cl.
*G06F 11/00* (2006.01)
*G06F 11/30* (2006.01)

(52) U.S. Cl. ............................ 714/38; 714/26; 714/37

(58) Field of Classification Search .................... 714/26, 714/37, 38, 46, 47, 45, 48, 57
See application file for complete search history.

(56) References Cited

U.S. PATENT DOCUMENTS

| | | | |
|---|---|---|---|
| 5,301,320 A | 4/1994 | McAtee et al. | |
| 5,438,508 A | 8/1995 | Wyman | |
| 6,028,997 A | 2/2000 | Leymann et al. | |
| 6,098,179 A * | 8/2000 | Harter, Jr. | 714/4 |
| 6,708,333 B1 | 3/2004 | Glerum et al. | |
| 6,754,854 B2 * | 6/2004 | Kurrasch | 714/47 |
| 6,859,893 B2 * | 2/2005 | Hines | 714/38 |
| 6,898,733 B2 | 5/2005 | Parks et al. | |
| 7,013,411 B2 * | 3/2006 | Kallela et al. | 714/47 |

(Continued)

FOREIGN PATENT DOCUMENTS

WO    0074193 A1    12/2000

OTHER PUBLICATIONS

Wikipedia's Login version from May 28, 2007 http://en.wikipedia.org/w/index.php?title=Login&oldid=133994201.*

(Continued)

*Primary Examiner* — Scott T Baderman
*Assistant Examiner* — Joseph Schell
(74) *Attorney, Agent, or Firm* — Senniger Powers LLP (57) ABSTRACT

A computerized method for collecting error data and providing error reports relating to occurrences of errors of software applications installed on one or more computing devices is disclosed. Data for describing software applications and identifying software application errors is collected from the computing devices and stored in a catalog. Data associated with error occurrences is obtained and combined with related data being stored in the catalog. A report is generated based on the error occurrences and related catalog data.

8 Claims, 5 Drawing Sheets

U.S. PATENT DOCUMENTS

| | | | |
|---|---|---|---|
| 7,120,833 B2 | 10/2006 | Kinderman et al. | |
| 7,127,642 B2 | 10/2006 | Wang et al. | |
| 7,146,536 B2 * | 12/2006 | Bingham et al. | 714/26 |
| 7,162,538 B1 * | 1/2007 | Cordova | 709/238 |
| 7,171,593 B1 * | 1/2007 | Whittaker et al. | 714/57 |
| 7,203,967 B2 | 4/2007 | Chmaytelli et al. | |
| 7,259,666 B1 * | 8/2007 | Hermsmeyer et al. | 340/517 |
| 7,380,177 B2 * | 5/2008 | Goin et al. | 714/47 |
| 7,428,546 B2 | 9/2008 | Nori et al. | |
| 7,475,293 B1 * | 1/2009 | Little et al. | 714/48 |
| 7,483,898 B2 | 1/2009 | Abdo et al. | |
| 7,555,531 B2 | 6/2009 | Teodosiu et al. | |
| 7,584,220 B2 | 9/2009 | Bozeman et al. | |
| 7,593,943 B2 | 9/2009 | Clarke et al. | |
| 7,702,959 B2 * | 4/2010 | Hwang et al. | 714/38 |
| 2002/0112171 A1 | 8/2002 | Ginter et al. | |
| 2002/0147606 A1 | 10/2002 | Hoffmann et al. | |
| 2002/0162053 A1 | 10/2002 | Os | |
| 2003/0150908 A1 * | 8/2003 | Pokorny et al. | 235/375 |
| 2003/0208593 A1 * | 11/2003 | Bharati et al. | 709/224 |
| 2005/0004873 A1 | 1/2005 | Pou et al. | |
| 2005/0034098 A1 | 2/2005 | DeSchryver et al. | |
| 2005/0047350 A1 | 3/2005 | Kantor et al. | |
| 2005/0108173 A1 | 5/2005 | Stefik et al. | |
| 2005/0108677 A1 | 5/2005 | Jain et al. | |
| 2005/0114265 A1 | 5/2005 | Satkunanathan et al. | |
| 2005/0204200 A1 | 9/2005 | Gadangi et al. | |
| 2005/0289072 A1 | 12/2005 | Sabharwal | |
| 2005/0289401 A1 | 12/2005 | Goin et al. | |
| 2006/0064335 A1 | 3/2006 | Goldszmidt et al. | |
| 2006/0112122 A1 | 5/2006 | Goldszmidt et al. | |
| 2006/0136784 A1 | 6/2006 | Prescott et al. | |
| 2007/0055914 A1 * | 3/2007 | Chandwani et al. | 714/47 |
| 2007/0094145 A1 | 4/2007 | Ta et al. | |
| 2008/0320486 A1 | 12/2008 | Bose et al. | |

OTHER PUBLICATIONS

Nakhimovsky, Greg et al, "Enabling User-Controlled Collection of Application Crash Data With DTrace," available at http://developers.sun.com/solaris/articles/app_crash/app_crash.html, May 2005, 10 pages.

International Search Report and Written Opinion, International Application No. PCT/US2008/050195, dated May 30, 2008, 10 pages.

Ganapathi, Archana et al., Crash Data Collection: A Windows Case Study, http://www.cs.berkeley.edu/~archanag/publications/dsn05_ganapathi.pdf, created on Apr. 1, 2005, 6 pages.

Brodie, Mark et al., Quickly Finding Known Software Problems via Automated Symptom Matching, Proceedings of the Second International Conference on Autonomic Computing (ICAC'05), http://ieeexplore.ieee.org/iel5/10030/32175/01498056.pdf?tp=&arnumber=1498056&isnumber=32175, Jun. 2005, 10 pages, IEEE Computer Society, US.

Author Unknown, Microsoft System Center Operations Manager 2007, http://download.microsoft.com/download/5/E/F/5EF5C723-A451-471A-B06D-7249B99DC52A/Whitepaper%20-%20-Systems%20Center%20Operations%20Manager%202007%-20Overview.doc, Jul. 2006, 11 pages.

* cited by examiner

| PROBLEM REPORT | | | | |
|---|---|---|---|---|
| Look for: | | Find now  Clear  306 | | SEARCH BY MACHINE 304 |
| | | | | LOGGED IN AS CHRIS GREEN (logout) 310 |
| PRODUCT △ 302 | STATUS | PROBLEM 308 | VERSION | OCCURRENCES |
| ACROBAT READER | SOLUTION AVAILABLE | STOPPED WORKING | 6.01 | 877 |
| CRIMSON EDITOR | MICROSOFT INVESTIGATING | NON-RESPONSIVE | 3.70 | 564 |
| OFFICE EXCEL | SOLUTION AVAILABLE | APPLICATION RESTART | 2003 SP2 | 411 |
| OFFICE POWERPOINT | NO SOLUTION | NON-RESPONSIVE | 2003 SP2 | 180 |
| OFFICE VISIO 312 | SOLUTION AVAILABLE | NON-RESPONSIVE | 2007 B2 | 99 |
| OFFICE WORD | NO SOLUTION | NON-RESPONSIVE | 2003 SP2 | 78 |
| PHOTOSHOP | ADOBE INVESTIGATING | NON-RESPONSIVE | CS2 (9.0) | 66 |
| PUBLISHER | NO SOLUTION | NON-RESPONSIVE | CS2 (5.0) | 56 |

TITLE DETAILS
SUMMARY | AFFECTED MACHINES 334
SOLUTION INFORMATION 316

TITLE: OFFICE VISIO 318
PUBLISHER: MICROSOFT CORPORATION 320
VERSION: 2007 SP2 (12.5509.6568) 314
COMPATIBILITY: WINDOWS XP PRO, WINDOWS 2003 SERVER, WINDOWS VISTA 322
DESCRIPTION: MICROSOFT VISIO HAD AN UNEXPECTED ERROR. 326
PROBLEM DESCRIPTION: MICROSOFT HAS REVIEWED THIS ERROR AND DETERMINED THAT THIS 328
PROBLEM IS FIXED IN OFFICE 2007 BETA 2 REFRESH BUILD.
SOLUTION: PLEASE UPGRADE TO OFFICE 2007BETA2 REFRESH BUILD FROM 330
MICROSOFT OFFICE BETA WEBSITE
PROBLEM SIGNATURE: VISIO.EXE; APP VERSION; 12.0,4017.1005; FAULT MODULE; VSCORE.DLL... 332

HOME
ASSETS
REPORTS
ALERTS
SETTINGS
FAVORITES

ASSETS
ASSETS SOFTWARE..
THIRD PARTY...

FIG. 4

OBJECTIVE ASSESSMENT OF APPLICATION CRASHES FROM A CUSTOMER ENVIRONMENT

BACKGROUND

The present invention generally relates to, in general, to assessing application errors and error symptoms in a computing environment, and in particular, to objectively assessing application errors and error symptoms from a customer computing environment.

As information technology capabilities have increased steadily due to improvements in technology and practices, organizations have grown increasingly reliant on the information technology infrastructure to support critical organization processes and to create new opportunities. One primary business use of information technology often occurs through software applications. Thus, maintaining reliable and available software application is important to supporting efficient business processes and fostering improvements in these processes.

Network administrators typically manage the maintenance and improvement of software application performance for the computing devices on the organization network. Maintaining reliable and available software applications is largely a matter of monitoring the errors and error symptoms, evaluating that against expected norms, and generating work items to troubleshoot and/or improve the errors and error symptoms based on the evaluation.

Because organizations typically have many computing devices having numerous software applications, monitoring the performance can be a difficult task. Many users of computing devices fail to report errors and error symptoms to network administrators. Even when users report errors and error symptoms to network administrators, the reports are often vague or unsure as to what the user was doing or which software applications they were using when an error or error symptom occurs. Thus, obtaining accurate software application error data within an organization network can be especially difficult.

Where accurate error data is collected, evaluating the error data requires understanding the relationship between the data collected and the error that occurred. In many conventional practices, error data is merely reported as a file name which may be meaningless to network administrators or requires research in order to understand the relationship to the error that occurred.

Even where the context of the error data is understood, an evaluation of the error data requires compiling and sorting the data. For a large organization, compiling and sorting error data for the computing devices on the organization network is a large and time consuming task. Moreover, error data collected from a given network, does not provide network administrators with an understanding as to whether the software is performing at a normal level. Such an understanding is achieved with information relating to occurrences of errors and error symptoms in other organizations in the industry and allows organizations to diagnose and assign priority to troubleshooting and improving software application performance.

For example, where a network administrator learns that a particular software application is experiencing large numbers of errors across the organization's network, a comparison of errors occurring with the software application in other organizations in the industry allows a network administrator to determine whether the errors maybe caused by the software application itself or whether they maybe caused by an issue unique to the organization's network. In addition, where a network administrator is considering deploying a software application update or upgrade, accessing error data for the particular software application in other similar organization networks provides the network administrator with insight as to the effect the update or upgrade will have on his organization's network.

Implementing solutions and preventing future software errors and their symptoms is a constant goal for network administrators. In large organizations where many errors are reported, identifying or developing solutions quickly and efficiently can be a challenge for network administrators. While conventional practices aid in identifying selected solutions currently available for a particular error to the user, a significant number of errors are not resolved by these practices. Often, users do not implement the identified solutions because they do not understand how or do not wish to take the time. Additionally or alternatively, many solutions are not developed until after the error occurs and conventional practices fail to identify subsequently developed solutions to users.

SUMMARY

Embodiments of the invention overcome one or more deficiencies of conventional practices related to maintaining available and reliable software applications by collecting and providing meaningful data describing software application errors and compiling and evaluating data relating to errors occurring in a particular organization and across the industry. In addition, embodiments of the invention advantageously identify both solutions available at the time the error occurs and solutions developed after the error occurs. The solutions are reported to the network administrator.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

DETAILED DESCRIPTION

Embodiments of the invention conveniently solve the problems of understanding, resolving, and reporting of errors occurring on software applications installed on computing devices in a particular environment. Exemplary embodiments of the present invention improve existing reporting of individual error files by providing diagnostic and solution data which can be compiled and compared for selected users, software applications and related groupings thereof.

Figure 1:
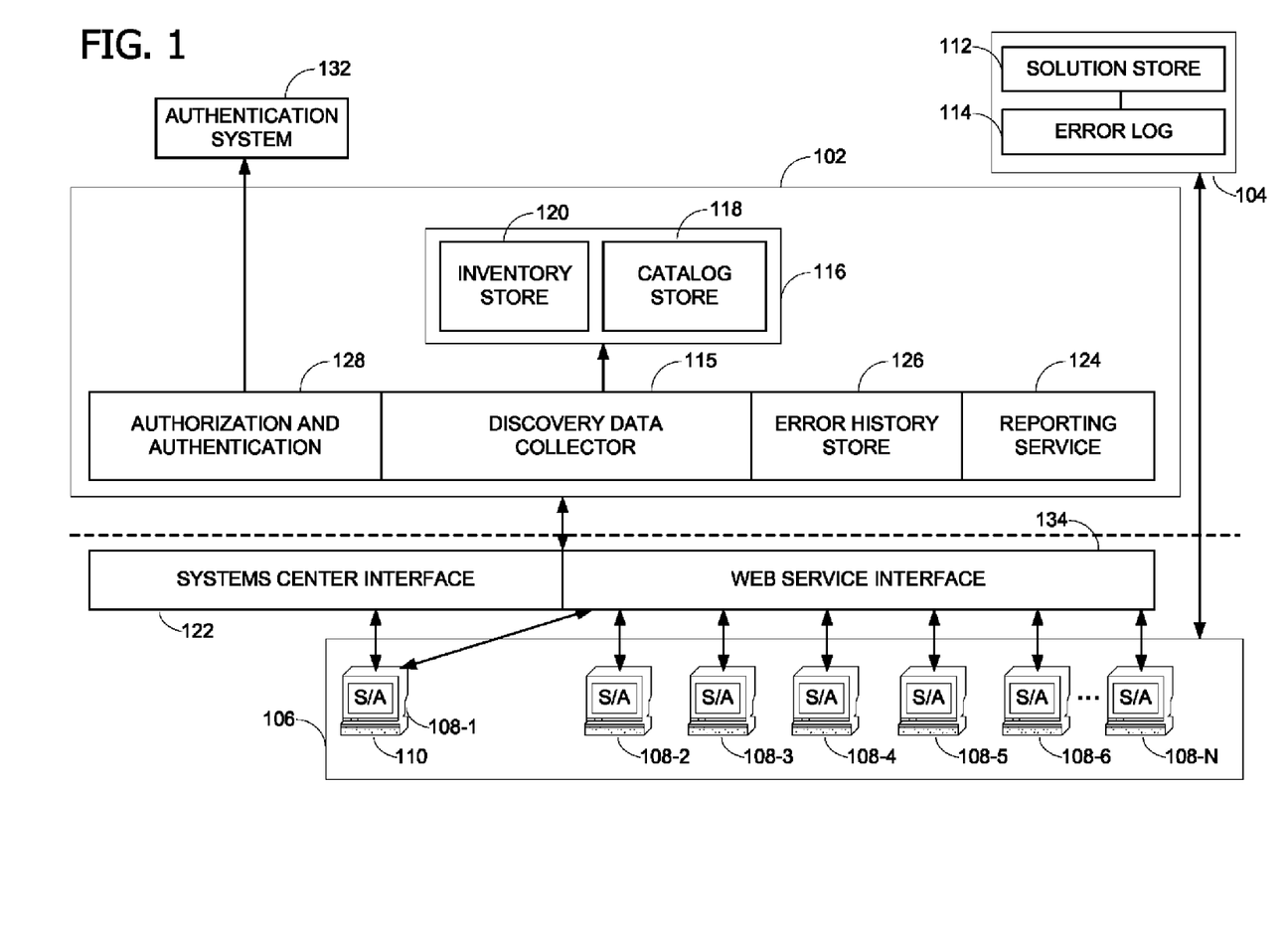
FIG. 1 is a block diagram illustrating an exemplary network environment for collecting error data and providing error reports relating to occurrences of errors of software applications installed on one or more computing devices 108, according to an embodiment of the invention.

Referring now to FIG. 1, a block diagram illustrates an exemplary network environment 100 in which the present invention may be utilized to collect error data and provide error reports. For illustration purposes only and not by limitation, the network environment 100 includes a central management site hereinafter referred to as systems center site 102, an error logging site 104, and a user site 106 having at least one computing device 108. According to one embodiment of the invention, the systems center site 102 includes servers, Internet servers, or other computing devices hosted or managed by an error reporting vendor or a third-party affiliated with the error reporting vendor. Similarly, the error logging site 104 includes servers, Internet servers, or other computing devices hosted or managed by an error logging vendor or a third-party affiliated with the error reporting vendor. Although illustrated as separate sites, it is to be understood that the systems center site 102 and the error logging site 104 may be one site and/or the error reporting vendor and the error logging vendor may be the same entity. In another embodiment of the invention, the user site 106 is not limited to a physical location of a particular user entity. For example, the user site 106 may be an enterprise in which its computing devices 108 span across one or more geographical locations (e.g., different office locations in Seattle, New York, Chicago). According to embodiments of the invention, the systems site obtains error data from the error logging site 104 and generates error reports relating to errors occurring with software applications installed on the computing devices 108 at the user site 106.

Still referring to FIG. 1, the user site 106 includes a plurality of computing devices 108, each with the software application S/A installed thereon. The software application S/A may be any software program, an operating system, and/or a suite of software applications. Exemplary computing devices 108 include one or a combination of the following: a personal computer (PC), a workstation, a cellular phone, a portable digital device, a personal digital assistance (PDA), a pocket PC, a digital media player, and any other digital devices in the user site 106. As is known to those skilled in the art, the computing devices 108 include a combination of the following (not shown): a processing unit, one or more computer-readable media, an internal bus system coupling to various components within the computing devices 108, Input/Output devices, a networking device, and other devices. In one alternative embodiment, computer-readable media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, radio frequency (RF), infrared, and other wireless media, are examples of communication media. Combinations of any of the above are also included within the scope of computer readable media.

The computing devices 108 are coupled to a data communication network. In this embodiment, the computing devices 108 at the user site 106 may be connected to the data communication network via a wired or wired or wireless communication channel. The systems center site 102 and the error logging site 104 are also coupled to the data communication network such that the systems center site 102, the error logging site 104, and the computing devices 108 at the user site 106 can communicate via the data communication network. In this example, the network is the Internet (or the World Wide Web). However the teachings of the present invention can be applied to any data communication network. The computing devices 108 at the user site 106 may be connected via an internal data communication network so that a network administrator 110 has access to the remaining computing devices 108 at the user site 106. Alternatively, the network administrator 110 can access the computing devices 108 via the data communication network.

The error logging site 104 communicates with the computing devices 108 via the data communication network to retrieve error data indicating a file associated with the occurrence of an error of a software application installed on the computing devices 108. As shown in FIG. 1, the error logging site 104 includes a solution store 112. The solution store 112 contains solution data which corresponds to error data retrieved from the computing devices 108. The solution store 112 is maintained by the error logging vendor. Accordingly, the solution data includes information currently or previously known or received by the error logging vendor to diagnose or resolve software application errors currently or previously known or received by the error logging vendor. Upon the occurrence of an error, the computing device generates error data indicating a file associated with the occurrence of the error of a particular one of the installed software applications. The data is presented to a user of the computing device 108 and then communicated to the error logging site 104. The error logging site 104 searches the solution store 112 for solution data corresponding to the error data. The error logging site 104 then communicates the result of the search to the computing device 108.

According to one embodiment of the present invention, the systems center site 102 collects data associated with a particular software application installed on computing devices 108 for providing to the user as a result of an error occurrence of the particular software application. In one embodiment illustrated in FIG. 2, a discovery agent 200 is used to collect data from each of the computing devices 108. The discovery agent 200 may be a collection of computer-executable instructions, computer-executable codes, computer-executable components, a program, or any device that attempts to discover the software applications installed on the computing device 108 and to locate information identifying the installed software applications and file data associated with the installed software applications. For example, the discovery agent 200 discovers a software application installed on computing device 108 and locates the product name and file data used by the software application to indicate the occurrence of an error. In another embodiment, the discovery agent 200 may locate additional descriptive information and file data associated with the installed software application and information associated with the hardware of the computing device 108. Such descriptive information and file data includes any information, including information which is machine-specific, which is known in the art to be associated with the installed software and located on the computing device 108 where the software is installed. In another alternative embodiment, the discovery agent 200 may be configured to locate one or more particular types of descriptive information and/or one or more particular types of file data. In yet another alternative embodiment, the discovery agent 200 may be configured to identify one or more types of software applications.

Figure 2:
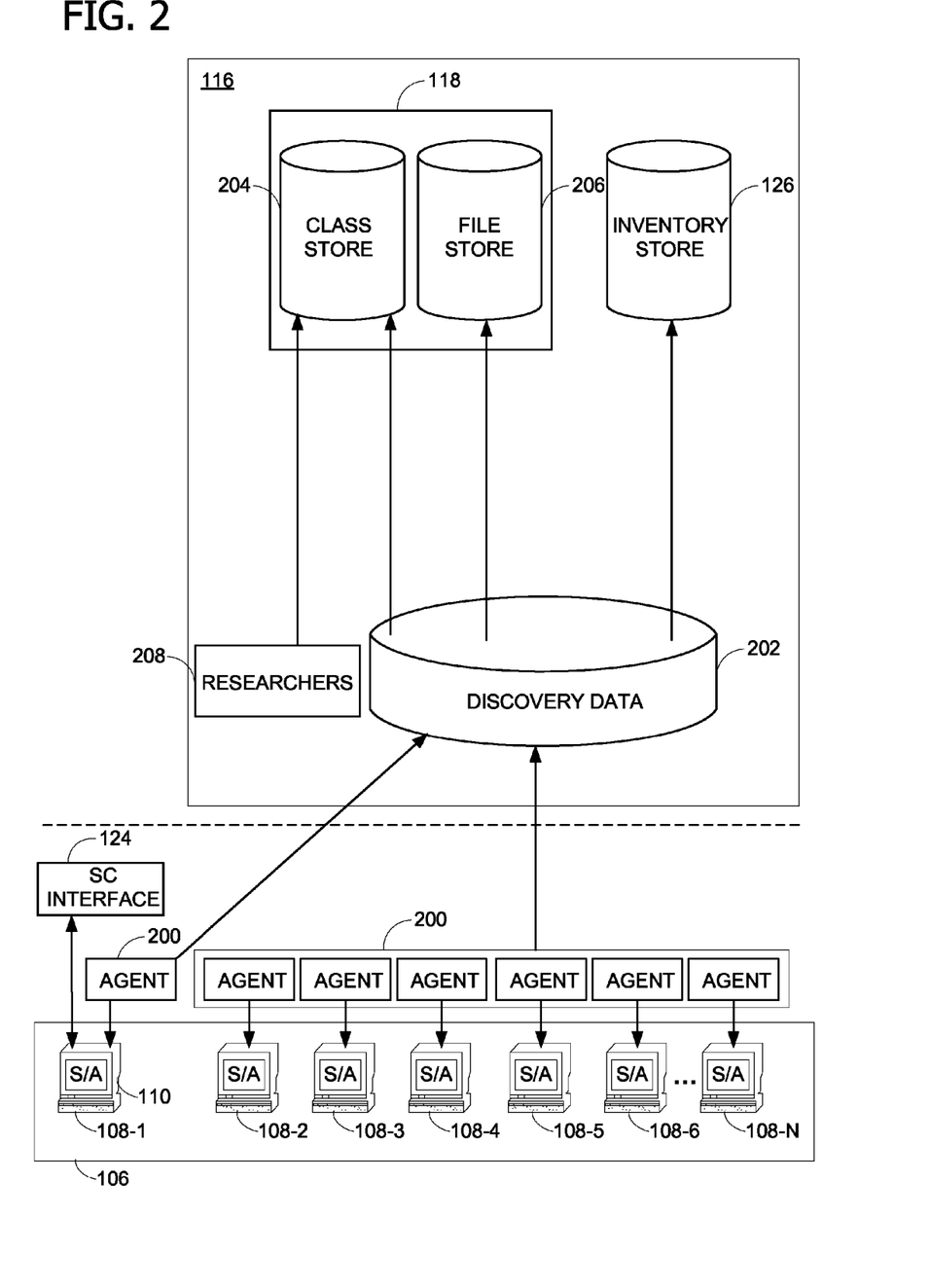
FIG. 2 is a block diagram illustrating discovery agents collecting data for cross-referencing and storing data in a catalog, according to an embodiment of the invention.

According to one embodiment, the discovery agent 200 is distributed at the systems center site 102 to the network administrator 110. The network administrator 110 may include any entity with permission to access the systems center site 102 on behalf of other computing devices 108. The discovery agent 200 is thereafter deployed by an administrator(s) 110 at the user site 106. For example, the administrator 110 may receive the discovery agent 200 from the systems center site 102 and subsequently deploy the discovery agent 200 at a later time (e.g., off-peak time) to computing devices 108 at the user site 106. In an alternate embodiment, the discovery agent 200 is deployed to each of the computing devices 108 from the systems center site 102 rather than running continuously as a background process. In one alternative embodiment, the discovery agents 200 identify information based on per-install or per-client access basis. For example, the systems center site 102 may electronically transmit or send the discovery agent 200 to each of the computing devices 108 via the data communications network. As the discovery agent 200 discovers and locates the data associated with the installed software applications, a data discovery collector 115 at the systems center site 102 receives or collects data.

According to another embodiment of the present invention illustrated in FIG. 2, the systems center site 102 uses a catalog 116 for storing the collected data 202. Discovery data 202 stored in the catalog may include one or more of the following data types: software application reference data, file reference data, and CPU reference data. In one embodiment, the systems center site 102 includes a catalog store 118 for storing data which is common to multiple computing devices 108 and an inventory store 120 for storing information which is specific to an individual computing device 108. Although illustrated as separate stores in FIGS. 1 and 2, it is to be understood that the catalog store 118 and the inventory store 120 may be embodied by a single data store in an embodiment of the invention. It is also to be understood that the catalog store 118 and inventory store 120 could comprise a data site connected to the data communications network which is independent of the systems center site 102 but accessible by the systems center site 102.

The catalog store 118 may include a class store 204 and a file store 206. The class store 204 is defined by software application reference data collected by the discovery data collector 115 including one or more of the following relating to an installed software application: software category, application identifier, product name, product version, product manufacturer application description, language supported by application, and/or product support information. The file store 206 is defined by file reference data collected by the discovery data collector 115 including various attributes of files (e.g., executable and/or reference files relating to a software application) located by the discovery agent 200. According to another embodiment, for each file which the data collector 115 collects file reference data, a "finger-print" will be generated (e.g., a hash of the various attributes of the file)and used to resolve duplications of file entries.

According to another embodiment of the present invention, the systems center site 102 uses the catalog 116 for cross referencing the collected data 202. The catalog 116 includes mapping data which is used to cross-reference or associate related data being stored in the catalog 116. For example, the catalog 116 includes file mapping reference data which is a mapping table that associates class data (e.g., software application reference data) with file data (e.g., file reference data). It is to be understood that collected data 202 may be organized for storage and cross-referenced according to alternate various parameters associated with the collected data 202 without departing from the scope of the invention. It is also to be understood that collected data 202 may be organized for storage and cross-referenced according to additional various parameters associated with the collected data 202 without departing from the scope of the invention. For example, the class data could be further grouped and categorized according to software application reference data parameters (e.g., name and manufacturer of software application).

According to another embodiment of the present invention, the systems center site 102 uses the catalog 116 for storing additionally acquired descriptive information and cross referencing the additionally acquired descriptive information to existing data in the catalog 116 associated with the installed software applications. In one embodiment, researchers 208 provide data in addition to the data collected 202 by the discovery data collector 115. The researched data may be provided to the catalog 116 manually and automatically. The data may be cross-referenced with existing data in the catalog 116 by manually adding it to a particular class store 204. The data may also be cross-referenced with existing data in the catalog 116 according to the mapping data previously discussed. The researched data may include software product reference data, file reference data, CPU reference data and/or an additional data type. Researched software product reference data may include any one or more of the following: application version name, application family, application suite, application edition, required memory size, required disk size, required number of processors and processor family, and/or supported operating system. Additionally, researched data may include solutions for errors occurring in the cross referenced data associated with the software applications. In an alternate embodiment, descriptive data stored by the catalog 116 includes researched data wherein researched data includes data collected 202 by a discovery agent 200. In another alternate embodiment, descriptive data stored by the catalog 116 includes researched data the additional descriptive information is acquired using a discovery agent 200.

According to another embodiment of the present invention, the systems center site 102 obtains error data indicating a file associated with the occurrence of an error of a particular one of the installed software applications. As illustrated by FIG. 1, the systems center site 102 accesses via the data communication network the error data logged by the error logging site 104. Additionally or alternatively, the discovery agent 200 discovers error data on the computing devices 108 and the systems center site 102 obtains the error discovered by the discovery agent 200. In this manner, the systems center site 102 tracks the occurrences of errors on software applications installed on each of the computing devices 108. In one embodiment, the systems center site 102 is configured to obtain error data relating to the occurrence of errors of software applications installed on particular computing devices 108 (e.g., selected or registered computing devices 108) based on error data logged by the error logging site 104. Additionally or alternatively in another embodiment, the systems center site 102 is configured to obtain error data relating to the occurrence of errors on particular software applications based on error data logged by the error logging site 104.

According to one embodiment, the systems center site 102 searches the solution store 112 for a solution associated with the error indicated by the error data. In another embodiment, the error logging site 104 searches the solution store 112 for a solution information associated with the error indicated by the error data. The error logging site 104 stores the solution information so that the error data obtained from the error logging site 104 includes solution information associated with the error indicated by the error data.

According to another embodiment of the present invention, the systems center site 102 includes a reporting service 124 which generates an error report based on the data obtained from the error logging site 104 and data stored in the catalog 116. In one embodiment, a file indicating an error occurrence obtained from the error logging site 104 is used by the reporting service 124 to identify the installed software application associated with the error. For example, the reporting service 124 queries the file store 206 for a particular file obtained from the error logging site 104 indicating an error occurring in the installed software application. The reporting service 124 maps the file resulting from the query to software application data. The mapped software application data identifies the software application and may contain additional descriptive information about the software application. The reporting service 124 then generates a report to provide the descriptive information and error data to a user via an interface 122. According to embodiments of the invention, the report may be transmitted from the systems center site 102 to the user site 106 via a web page, an electronic mail, messaging system, or other means of communications (e.g., facsimile). The interface may include 122 a website or a common data communication network.

Figure 3:
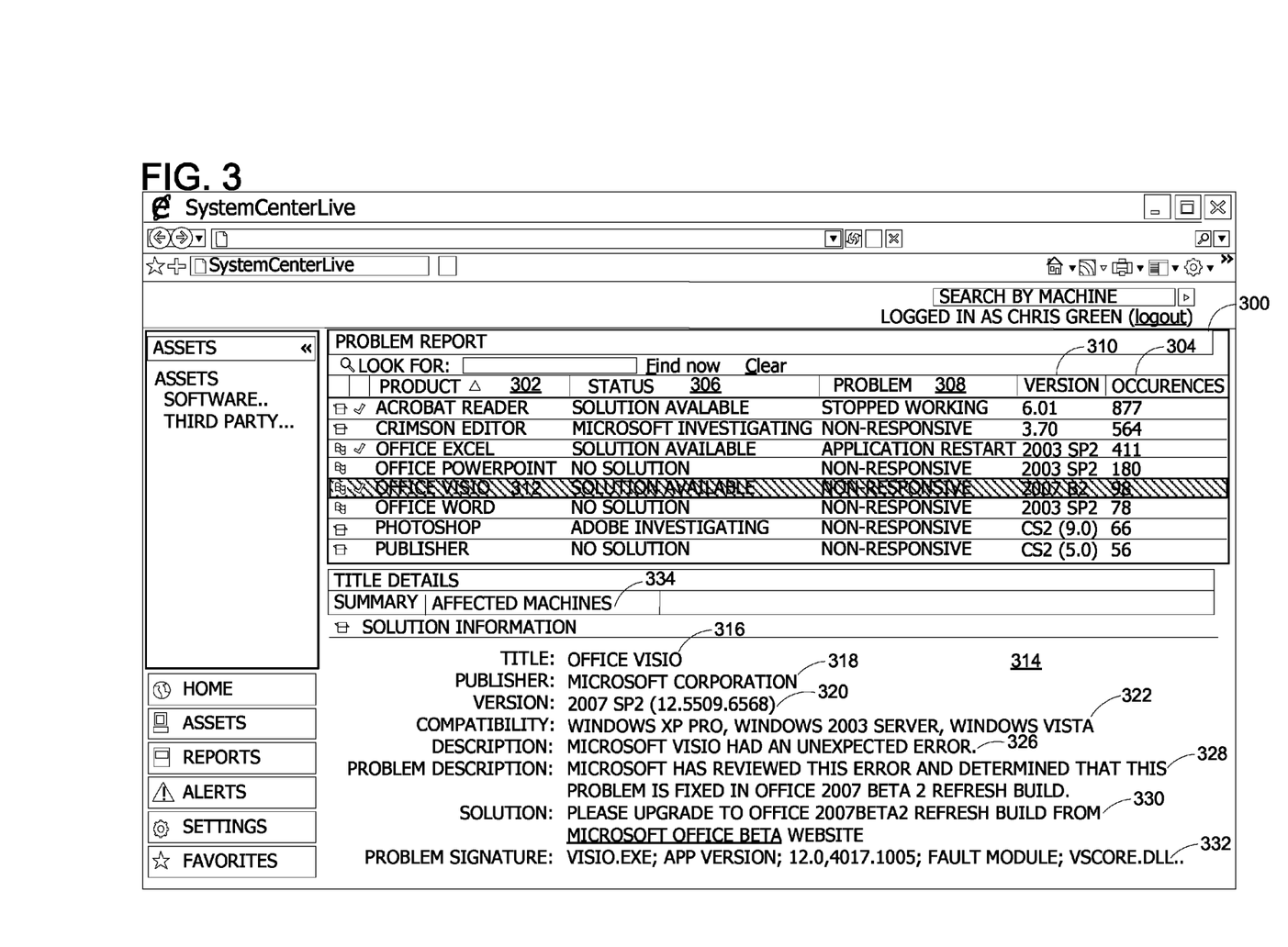
FIG. 3 is a drawing of a screen shot illustrating an exemplary report provided to a user through a user interface on a computing device summarizing occurrences of errors of software applications installed on one or more computing devices, according to an embodiment of the invention.

FIG. 3 illustrates an exemplary report including the descriptive information and error data generated according to an embodiment of the invention. In one embodiment, the discovery agent 200 is used to collect information for one or more software applications installed on selected computing devices 108 at the user site 106. For example, the discovery agent 200 is distributed to the network administrator 110 and the network administrator 110 selects computing devices 108 at the user site 106 and deploys the discovery agent 200 on the selected computing devices 108. The discovery agent identifies an installed software application, such as a drawing and diagramming software application (e.g., Visio®), and locates the related files data (e.g., Visio.exe) and descriptive information (e.g., the name of the publisher, the version, and compatibility information). This data is collected and the file data is stored in the file store 206 and is cross referenced to the descriptive information which is stored in the catalog store 118. A researcher determines additional information relating to the error file (e.g., Visio.exe file indicates that Microsoft Visio software had an unexpected error). The researcher stores this description in the catalog and cross references it to the Visio.exe. file data. The reporting service 124 obtains error data for the selected computing devices 108 from the error logging site 104 which contains the Visio.exe file. The reporting service 124 queries the file store 206 for each of the files including the Visio.exe file. The Visio.exe file is located and the cross referenced data in the catalog 116 is identified e.g., the name of the publisher, the version, compatibility information, and the description. The reporting service 124 also queries the solution store to identify solution information (e.g., a solution and problem description) associated with the files obtained in the error data. The reporting service 124 then compiles the data and generates a report.

For example, the report 300 shows one or more software applications 302 installed on the selected computing devices 108 at the user site 106. For each of the one or more software applications 302 the report shows the number of errors 304 which occurred on the software application 302 installed on the selected computing devices 108, the solution status 306, the problem 308 the error caused to the software application 302, and the version 310 of the software application 302. The report service allows the user to perform various operations (e.g., sort, select, filter, query, and/or search) with respect to the information provided in the report 300 to further customize the report. For a selected application 312, the report provides additional descriptive details 314 regarding the software application 312 and the error data. For the drawing and diagramming software named "Office Visio" 312, the report 300 describes the title 316, publisher 318, version 320, compatibility information 322, and a description of the latest error 326 identified from the catalog 116. Additionally, the report provides the description of the problem 328 and the available solution 330 identified from the solution store. The error data is described in a problem signature 332. For a selected application, the report 300 also provides details 334 regarding the computing device 108 on which the selected software application 312 errors occurred.

Figure 4:
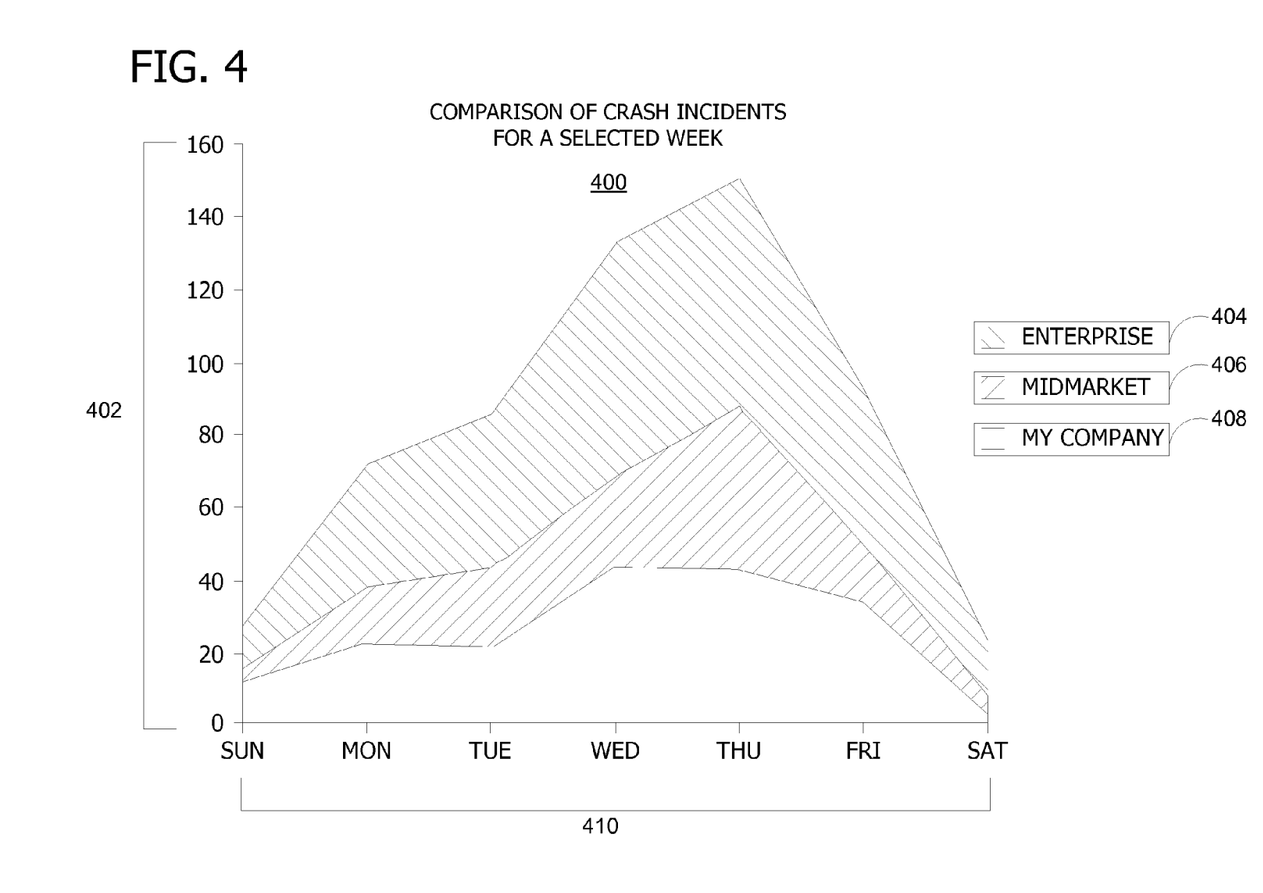
FIG. 4 is a graph illustrating an exemplary report comparing the occurrence of errors in a software application installed on a first group of computers to the occurrence of errors in the software application installed on a second group of computers, according to an embodiment of the invention.

FIG. 4 illustrates a comparative exemplary report including the descriptive information and error data generated according to an embodiment of the invention. In one embodiment, the discovery agent 200 is used to collect information related to one or more software applications installed on selected computing devices 108 at multiple user sites 106. For example, a network administrator 110 at user site 106 registers for the services offered by the systems center site 102. The authentication and authorization service 128 illustrated in FIG. 1 identifies the user (e.g., the particular entity or organization associated with the user site 106) of the computing device 108. Particularly, the user may be identified by receiving login information from the user and authenticating the user based on the received login information. The user may be authenticated using a presently available multi-site user authentication system 132. As part of the authentication process, a unique identifier is associated with the user. The discovery agent 200 is distributed to the network administrator 110 at each user site 106 and the network administrator 110 selects computing devices 108 at the user site 106 and deploys the discovery agent 200 on the selected computing devices 108. The discovery agent 200 registers each of the selected computing devices 108 with the systems center site 102 and associates the registered computing devices 108 with the unique identifier of the related user. The unique identifier will be included in any data, including error data and discovery data, transmitted from the registered computing devices 108 to the systems center site 102 such that it is associated with the transmitted data stored by the systems center site 102. The systems center site 102 may associate additional information with the unique identifier which is related to the user (e.g., industry of the user, number of computing devices related to the user).

The systems center site 102 displays various criteria for generating customized reports. The criteria may include any one or more of the data parameters obtained by the systems center site 102 associated with the user, computing devices 108, installed software applications, and error data. The report 400 illustrated in FIG. 4 is generated by an identified user selecting a software application (e.g., Microsoft Office 2003 SP3 Beta), a time frame (e.g., last week), and two categories of users (e.g., midmarket and enterprise). Based on the selected criteria, the reporting service 124 obtains error data from the error logging site 104 and queries the data stored in the catalog 116. The reporting service 124 then compiles the data and generates a report 400 comparing the number of errors occurring 402 with the selected software application, Microsoft Office 2003 SP3 Beta, on registered computing devices 108 associated with enterprise 404 and midmarket 406 users to the number of errors occurring with the selected software application, Microsoft Office 2003 SP3 Beta, on registered computing devices 108 associated with the identified user, My Company 408, over the course of the last week 410.

According to another embodiment of the present invention, the systems center site 102 records selected error data obtained from the error logging site 104 or the discovery agent 200 in the error history store 126. For a recorded error for which a solution was not found either in the descriptive data or as a result of searching the solution store 112, the systems center site 102 continues to search for a solution associated with the error. The systems center site 102 searches at a selected frequency (e.g., once a day)for a time period beginning upon generating the error report reporting the error and ending upon finding a solution or expiration of a pre-selected time period (e.g., 3 months), wherein the expiration of the time period occurs prior in time to finding the solution. The reporting service 124 generates another error report based on the results of the search at the end of the time period. In other embodiments, the systems center site 102 can be configured to continue searching based on any of the parameters for which the systems center site 102 obtains data. For example, the user can select using the interface 122 that the systems center site 102 continues searching for solutions only for a particular family of software applications.

Figure 5:
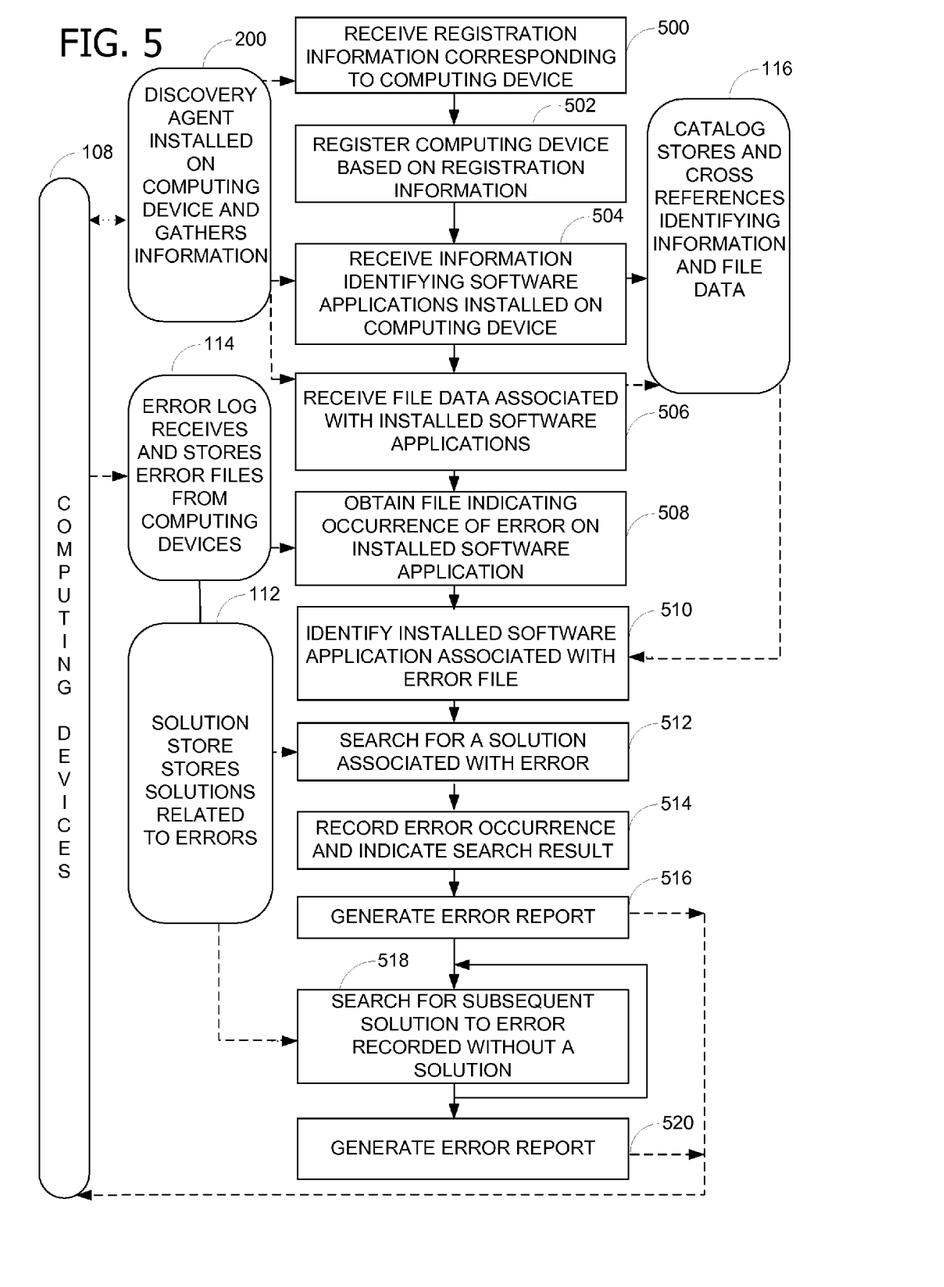
FIG. 5 is a flow diagram illustrating collecting error data and providing error reports relating to occurrences of errors of software applications installed on one or more computing devices, according to an embodiment of the invention.

The flow diagram in FIG. 5, illustrates collecting error data and providing error reports relating to occurrences of errors of software applications installed on one or more computing devices 108, according to an embodiment of the invention. At 500, the systems center site receives registration information from a user desiring the reporting services offered by the systems center site. The registration information includes information corresponding to the users computing device 110.

At 502, the systems center registers the computing device 110 based on the registration information provided by the user. The registration may include identifying the user. For example, the user may be identified by receiving login information from the user and authenticating the user by based on the received login information. As part of the authentication process, a unique identifier is associated with the user. The systems center site 102 then distributes a discovery agent 200 to the user's computing device 110 and the discovery agent 200 is downloaded on the user's computing device 110. The discovery agent 200 may be customized for the user based on the registration information provided by the user. The discovery agent 200 is deployed or downloaded to selected computing devices 108 at the user's site and installed on the selected computing devices 108. During the installation, the discovery agent 200 associates the computing device with identity of the user (e.g., the unique identifier) and provides registration information received by the systems center site 102. The installed discovery agent 200 gathers information on the computing device 108 including discovering installed software applications and locating descriptive information and file data associated with the installed software applications.

At 504, the discovery data collector 115 receives the information gathered by the discovery agent 200. The gathered and received information includes information identifying software applications installed on the registered computing devices 108. Likewise, at 506 the discovery data collector 115 receives the information gathered by the discovery agent 200. The gathered and received information includes file data associated with software applications installed on the registered computing devices 108. Particularly, the file data includes files indicating the occurrence of an error with the software application. The information received at 504 is cross referenced with the information received at 506 and stored in the catalog 116.

At 508, the systems center site 102 obtains from the error log 114 error data indicating a file associated with the occurrence of an error on particular one of the installed software applications. The error data obtained may include data associated with multiple users and/or registered computing devices 108. The error data obtained may be limited to include data associated with particular errors and/or data associated with errors occurring in particular time periods. In an alternate operation, prior to step 14, step 510 is repeated to obtain additional error data for tracking the occurrences of errors on the software applications.

At 510, the systems center site 102 uses the catalog 116 to identify the installed software application associated with an error file. The systems center site 102 may also identify selected data associated by the catalog 116 with the installed software application.

At 512, the systems center site 102 searches the solution store 112 for a solution associated with the error data obtained. In an alternate operation, the error logging site 104 accesses the solution store 112 for solutions related to the received error files. Where a solution is identified in the solution store 112, the error logging site 104 includes the solution information in the error data recorded in the error log. In another alternate operation, the solution information is added to the catalog 116 and cross referenced to the corresponding file.

At 514, the systems center site 102 records the error occurrence and indicates whether additional searching for a solution is required.

At 516, the reporting service 124 generates a report based on the information identified at 510 and the tracked occurrence of errors. The systems center site 102 provides reports to the user's computing device summarizing the errors of the registered computing devices 108 associated with the user. The reports can be customized by users based on criteria known (e.g., received, obtained, collected, accessed, and/or tracked) by the systems center site 102.

At 518, the systems center site 102 searches the solution store 112 for a solution added subsequent to the search at 512 corresponding to a recorded error indicating no identified solution. If no subsequent solution is identified, the systems center site 102 repeats step 518 periodically until a solution is identified. The solution may also be discontinued manually or automatically (e.g., after a specified period of time). At 520, the systems center site 102 generates a report indicating the solution identified. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computerized method for collecting error data and providing error reports relating to occurrences of errors of software applications installed on a group of computing devices, said computerized method comprising:

obtaining for each of a plurality of software application products, files names of files belonging to the software application product, wherein said plurality of software application products include the installed software applications;

collecting for each of the plurality of software application products, descriptive information corresponding thereto, said descriptive information including a product name of the corresponding software application product;

storing the identified file names and the collected descriptive information in a catalog, wherein the catalog cross references, for each software application product, the obtained file names of files belonging to the software application product with the descriptive information corresponding to said software application product;

obtaining error data responsive to an occurrence of an error in a particular one of the installed software applications, said error data including a file name of a file belonging to the particular one of the installed software applications that is associated with the occurrence of the error in said particular one of the installed software applications;

identifying from the error data, the file name of the file belonging to the particular one of the installed software applications that is associated with the occurrence of the error in said particular one of the installed software applications;

recording the occurrence of the error, wherein said recording includes adding the occurrence of the error to the descriptive information that is cross referenced in the catalog to the identified file name, said descriptive information including the product name of the software application product in which the error occurred;

computing, for the software application product in which the error occurred, a total number of error occurrences recorded from all of the computing devices in the group of computing devices for said software application product; and generating an error report for the computing device on which the error occurred, said error report having the descriptive information that is cross referenced in the catalog to the identified file name, wherein said descriptive information includes the product name of the software application product in which the error occurred and the computed total number of error occurrences for the software application product.

2. The computerized method of claim 1 further comprising searching for a solution associated with the identified file name and wherein the error report is further based on results of said search.

3. The computerized method of claim 2 further comprising searching periodically for a solution associated with identified file name until a solution is identified;

generating another error report indicating the identified solution.

4. The computerized method of claim 1 wherein the descriptive information further includes solutions for errors occurring in the corresponding software application product.

5. The computerized method of claim 1 further comprising acquiring additional descriptive information in the catalog cross referenced to an existing file name in the catalog.

6. The computerized method of claim 5 further comprising determining whether the existing file name has been included in the obtained error data; and generating an other error report having the acquired additional descriptive information that is cross referenced in the catalog to the existing file name, when said existing file name is determined to have been included in the obtained error data.

7. The computerized method of claim 1 wherein the error report compares recorded occurrences of an error in a software application installed on a first group of computing devices with recorded occurrences of the error in the software application installed on a second group of computing devices, wherein said first and second groups are based on an environment associated with the computing devices.

8. The computerized method of claim 1, wherein one or more tangible computer-readable media store computer-executable instructions for performing the method of claim 1.

* * * * *